United States Patent [19]

Daudelin

[11] Patent Number: 4,716,376
[45] Date of Patent: Dec. 29, 1987

[54] ADAPTIVE FSK DEMODULATOR AND THRESHOLD DETECTOR

[75] Inventor: Douglas S. Daudelin, Howell, N.J.

[73] Assignee: AT&T Information Systems Inc., Holmdel, N.J.

[21] Appl. No.: 697,001

[22] Filed: Jan. 31, 1985

[51] Int. Cl.[4] .............................................. H03K 9/06
[52] U.S. Cl. ................................... 329/107; 329/126; 329/145; 375/88; 375/94
[58] Field of Search ............... 329/104, 107, 110, 126, 329/137, 145; 375/80, 88, 94, 76, 100

[56] References Cited

U.S. PATENT DOCUMENTS

| | | | |
|---|---|---|---|
| 3,739,288 | 6/1973 | Coccagna | 329/104 |
| 3,748,586 | 7/1973 | Johnson et al. | 329/104 |
| 3,899,741 | 8/1975 | Brandt et al. | 329/104 |
| 4,270,208 | 5/1981 | MacDavid | 375/76 |
| 4,416,016 | 11/1983 | Iapicco | 329/145 X |

Primary Examiner—Eugene R. LaRoche
Assistant Examiner—James C. Lee
Attorney, Agent, or Firm—Barry H. Freedman

[57] ABSTRACT

An FSK demodulator of the differential type is arranged to provide two versions of an input FSK signal that, relative each other, (1) have a linear phase shift versus frequency characteristic and (2) are phase shifted by 90 degrees at a center frequency halfway between the upper and lower FSK frequencies. The linear phase shift is provided by an N sample delay element, while a constant phase shift circuit which includes a K factor gain element provides the 90 degree phase shift. By virtue of this arrangement, the demodulator characteristics can be adaptively varied and the demodulator tuned simply by changing the value of K. A similar adaptive technique is applied to a threshold detector arranged to position a threshold midway between the extremes of an input signal.

22 Claims, 5 Drawing Figures

ADAPTIVE FSK DEMODULATOR AND THRESHOLD DETECTOR

FIELD OF THE INVENTION

The present invention relates generally to demodulation of frequency shift keyed (FSK) signals and specifically to a demodulation arrangement that can be implemented using digital signal processing and can be made adaptive, if desired. An adaptive threshold detector useful to process the demodulator output is also described.

DESCRIPTION OF THE PRIOR ART

There are presently three common types of demodulation schemes used in FSK detection: discrimination, zero crossing, and differential. A general description of these three different types is contained in "Principles of Data Communication," by Lucky, Salz, and Weldon, chapter 8, McGraw-Hill, New York, 1968.

Discrimination and zero crossing types of demodulators frequently require the use of nonlinear devices such as limiters or rectifiers. Frequency aliasing caused by such devices becomes a handicap to demodulators implemented with digital signal processing techniques, and so are not suitable for use in many applications. Accordingly, the present invention relates specifically to differential demodulators.

Three functions are typically provided in a differential demodulator. First, the incoming FSK signal is filtered to remove channel degradations such as out of band noise, slope distortion and delay distortion. Second, another version of the FSK input signal is formed which is phase shifted an amount that is a function of the instantaneous signal frequency, and the product of the original and phase shifted versions is then computed. The product contains a dc component equal to the cosine of the phase difference between the two signals, and a double frequency component. Ideally, the phase difference is chosen to be 90 degrees at the carrier frequency, in order to permit maximum noise immunity. Third, the double frequency component is removed by filtering, and a decision is made about which of the two FSK frequencies is present in the input signal, based on the dc level of the product signal.

One illustrative implementation of a differential FSK demodulator is contained in U.S. Pat. No. 3,748,586 issued to R. A. Johnson et al on July 24, 1973. In that patent, a two pole pair mechanical filter 14 is chosen as a frequency sensitive phase shifting means, because it has a symmetrical and essentially linear phase versus frequency response.

The approach taken in the Johnson et al patent, like other prior art, requires custom design of the filter used to produce a desired relative phase shift. Each filter design is unique because it applies only to the particular FSK upper, lower and center frequencies involved. Accordingly, a given design must be altered before it can accommodate a different set of frequencies or a different A/D sampling rate. Such redesign adds to the development cycle and increases product cost. Also, filter design is often an iterative process, and the redesigned filter may not at first provide desired phase or amplitude characteristics, requiring additional revisions.

In view of the foregoing, it is one object of the present invention to provide a differential FSK demodulator in which the need for custom designed filters is eliminated.

During design of an FSK demodulator, it is also important to account for the degradations that the signal may suffer in the course of transmission through a communication facility. Two such degradations that may occur are frequency shift and amplitude distortion. Analog FSK demodulators are fairly robust in the presence of amplitude distortion, as long as they contain a limiter. However, digital signal processing based applications are frequently unable to use a limiter because of the spectral aliasing that this nonlinear operation causes.

To solve the foregoing problem, an adaptive equalizer can be incorporated into the front end filtering of an FSK demodulator in an attempt to undo some of the amplitude distortion. Unfortunately, such a filter is cumbersome to implement. Furthermore, frequency offset is a degradation to which both analog and digital demodulators are susceptible, and over which adaptive equalization has no effect. In view of the foregoing, it is another object of the present invention to eliminate or reduce the effects of communications channel degradations on the operation of an FSK demodulator.

SUMMARY OF THE INVENTION

The foregoing and additional objects are achieved in accordance with the principles of the present invention by an FSK demodulator of the differential type which includes means for generating, in response to an FSK signal having upper and lower frequencies, first and second versions of the FSK signal such that (1) the two versions have a linear phase shift vs. frequency characteristic relative to each other, and (2) the versions are shifted by 90 degrees in phase relative to each other at a center frequency halfway between the upper and lower frequencies. In the case of a hardware implementation, the linear phase shift vs. frequency is achieved by an N sample delay circuit. The 90 degree phase shift at the center frequency is achieved by a constant phase shift circuit which combines the output of a ±90 degree phase shifting circuit (advantageously a Hilbert filter) with the output of a scaling circuit having a variable gain factor K. The delay circuit and the constant phase shift circuit can each be responsive to the input FSK signal, or these circuits can be arranged in serial fashion. In the former arrangement, the signals output from each circuit are applied to means such as a digital multiplier arranged so that the upper and lower frequencies produce positive and negative d.c. signals, respectively, while the center frequency produces zero d.c. output. When the delay and phase shifting circuits are in series, the original FSK signal comprises one input to the multiplier, while the phase shifted signal is the second input.

Advantageous results can also be obtained in a software environment using, for example, a general purpose digital signal processor to perform the functions described above. The signals output from each circuit are applied to means such as a digital multiplier arranged so that the upper and lower frequencies produce positive and negative d.c. signals, respectively, while the center frequency produces zero d.c. output. When the delay and phase shifting circuits are in series, the original FSK signal comprises one input to the multiplier, while the phase shifted signal is the second input.

Advantageous results can also be obtained in a software environment using, for example, a general purpose digital signal processor, to perform the functions described above.

In accordance with another feature of the present invention, compensation for channel degradations is provided by adaptively varying the value of K. Adaptation is based on (1) detection of zero crossings in the demodulation output, (2) measurement of the output level at a fixed time increment after such detection, and (3) adjustment of K in accordance with successive sets of measurements.

By adaptively adjusting the value of K, the FSK demodulator can optimally detect an FSK signal composed of any two frequencies which lie within a broad range of the two frequencies the demodulator is initially tuned to detect. Additionally, where the two frequencies used by the transmitter are known by the receiver, the demodulator will adapt to compensate for communication channel degradations such as frequency shift or amplitude distortion. Even if the two frequencies are unknown, a simple training sequence may be employed to achieve the desired result.

The same adaptation technique can provide the basis for a threshold detection designed to discriminate between maximum and minimum levels in a slowly varying signal.

BRIEF DESCRIPTION OF THE DRAWING

The foregoing features and advantages of the present invention will be better appreciated from consideration of the following detailed description when read in light of the accompanying drawing in which.

DETAILED DESCRIPTION

Figure 1:
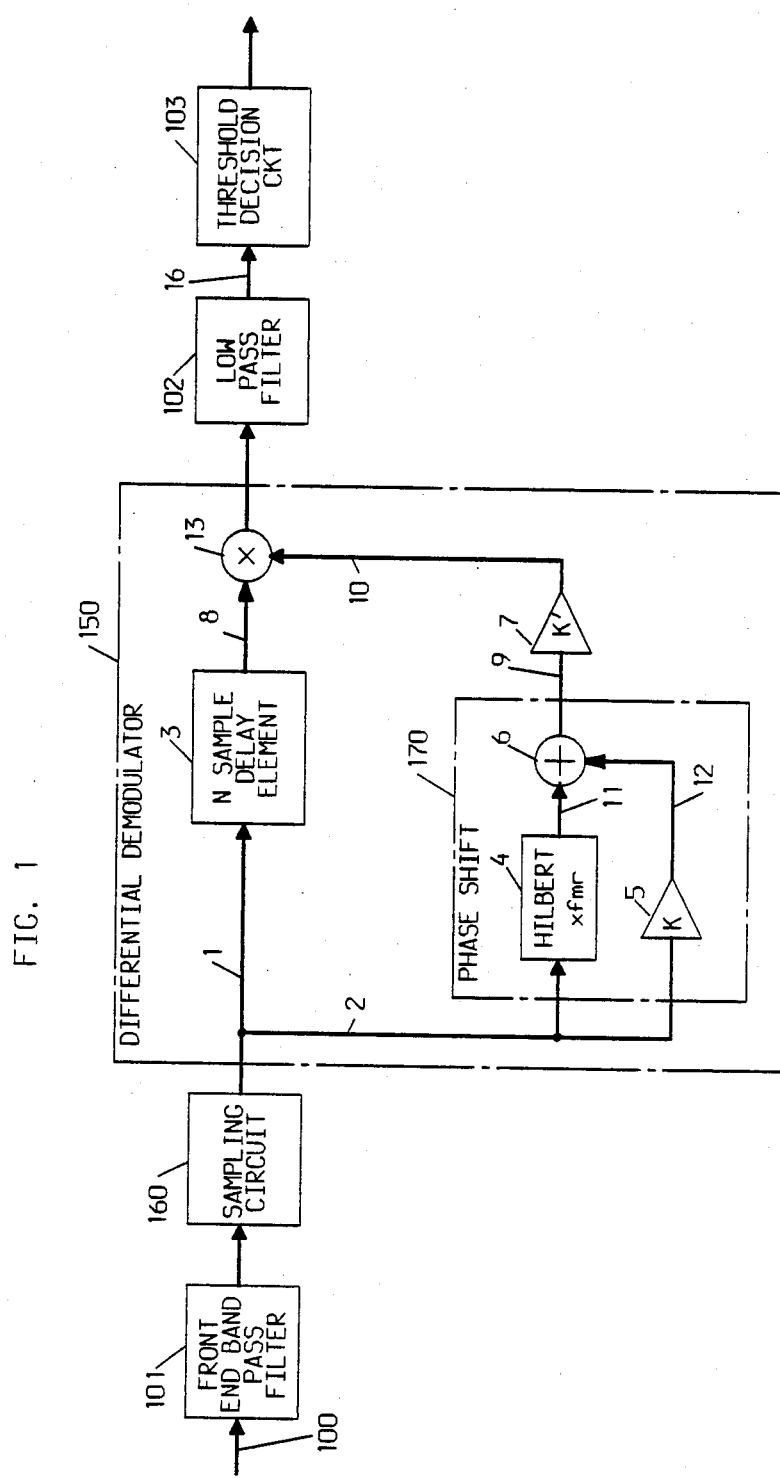
FIG. 1 is a block diagram of one embodiment of a digital FSK demodulator arrangement in accordance with the principles of the present invention.

A hardware implementation of an FSK demodulator including a differential detector arranged in accordance with the present invention is depicted in FIG. 1. The demodulator includes a front end band pass filter 101 designed to remove out of band frequency components from an input signal applied on line 100 and supply the filtered signal to a differential detector designated generally at 150 via a sampling circuit 160. The output of demodulator 150 is a d.c. signal plus a double frequency component which is applied to a low pass filter 102 and then to a threshold decision circuit 103, in order to detect either the lower or upper FSK frequency in the input signal.

In the differential detector 150, signal processing is performed digitally. The input to detector 150 consists of samples of the filtered FSK signal which are obtained by sampling the output of filter 101 at a rate S, using sampling circuit 160. The low pass filtered and sampled signal output from sampling circuit 160 is applied on line 1 to an N sample delay element 3, which is advantageously implemented as a simple finite impulse response (FIR) filter which has a linear phase shift vs. frequency characteristic. The slope of the phase shift provided in delay element 3 is directly proportional to N. The output of sampling circuit 160 is also applied on line 2 to a fixed phase shifting circuit 170 which includes a Hilbert transformer 4, a scaling circuit 5 and an adder circuit 6. The design of a finite length Hilbert transformer, which provides a phase shift of $-90$ degrees, is well known to those skilled in the art; a basic treatment of the subject can be found in "Digital Signal Processing," by Oppenheim and Schafer, chapter 7, Prentice Hall, Englewood Cliffs, 1975.

Phase shifting circuit 170 is arranged to apply the low pass filtered signal on line 2 to both Hilbert transformer 4 and to scaling circuit 5 having a gain factor "K". When the $-90$ degree shifted outputs of Hilbert transformer 4 and the non-shifted output of scaling circuit 5 on lines 11 and 12, respectively, are combined in adder 6, the resulting signal on line 9 is a version of the signal on line 2 having a constant phase shift applied to all frequency components; the magnitude of the phase shift in the output of adder circuit 6 on line 9 is determined by the value of coefficient K. The signal on line 9 has also undergone an increase in magnitude which is proportional to the value of K; this gain change can be undone by an optional scaling circuit 7 with gain K' if signal level is of consequence to ensuing arithmetic operations.

It should be noted here that most practical implementations of Hilbert transformer 4 result in the introduction of a fixed delay, which may be accounted for by arranging delay element 3 so that the relative delay between its output and the output of adder circuit 6 (or scaling circuit 7) is a total of N samples, including the delay introduced in Hilbert transformer 4.

The output of delay element 3 on line 8, which is a version of the sampled FSK signal with a phase shift imposed on it which is directly proportional to its frequency and the output of adder circuit 6 (or scaling circuit 7) on line 10, which is a version of the sampled FSK signal with a constant phase shift imposed on it, are applied to a multiplier 13. To optimize performance of the differential detector, the value of N is chosen to provide a desired phase shift difference between the upper and lower FSK frequencies. Then, the gain factor K associated with scaling circuit 5 is chosen so that there is a 90 degree phase difference between the signals on lines 8 and 10 when the FSK carrier (center) frequency is passed through the detector. In this manner, the dc level present in the output of multiplier 13 is zero when the carrier frequency is input on line 100. This arrangement gives the highest degree of noise immunity and also allows the ensuing threshold decision circuit 103 to operate by simply deciding if the value of the signal output from low pass filter 102 is greater or less than zero.

The functions performed by multiplier 13 can also be performed by other circuits responsive to the two versions of the FSK signal (i.e., the first version having a linear phase shift vs. frequency and the second version having a constant phase shift) which are arranged to provide an output which is indicative of the relative phase difference between the versions. For example, each of the versions can be squared and applied to an exclusive OR circuit, the output of which has a d.c. component that allows discrimination between the upper and lower FSK frequencies. It is also to be noted that the use of a multiplier is, however, advantageous, because the effects of the higher order harmonic introduced by that nonlinear operation can be eliminated in a digital signal processing implementation.

It should be noted that although the above-mentioned 90 degree phase difference provides the greater degree of noise immunity and allows a simple threshold decision circuit (103) to be used, other phase differences close to 90 degrees may be acceptable in certain applications.

Figure 2:
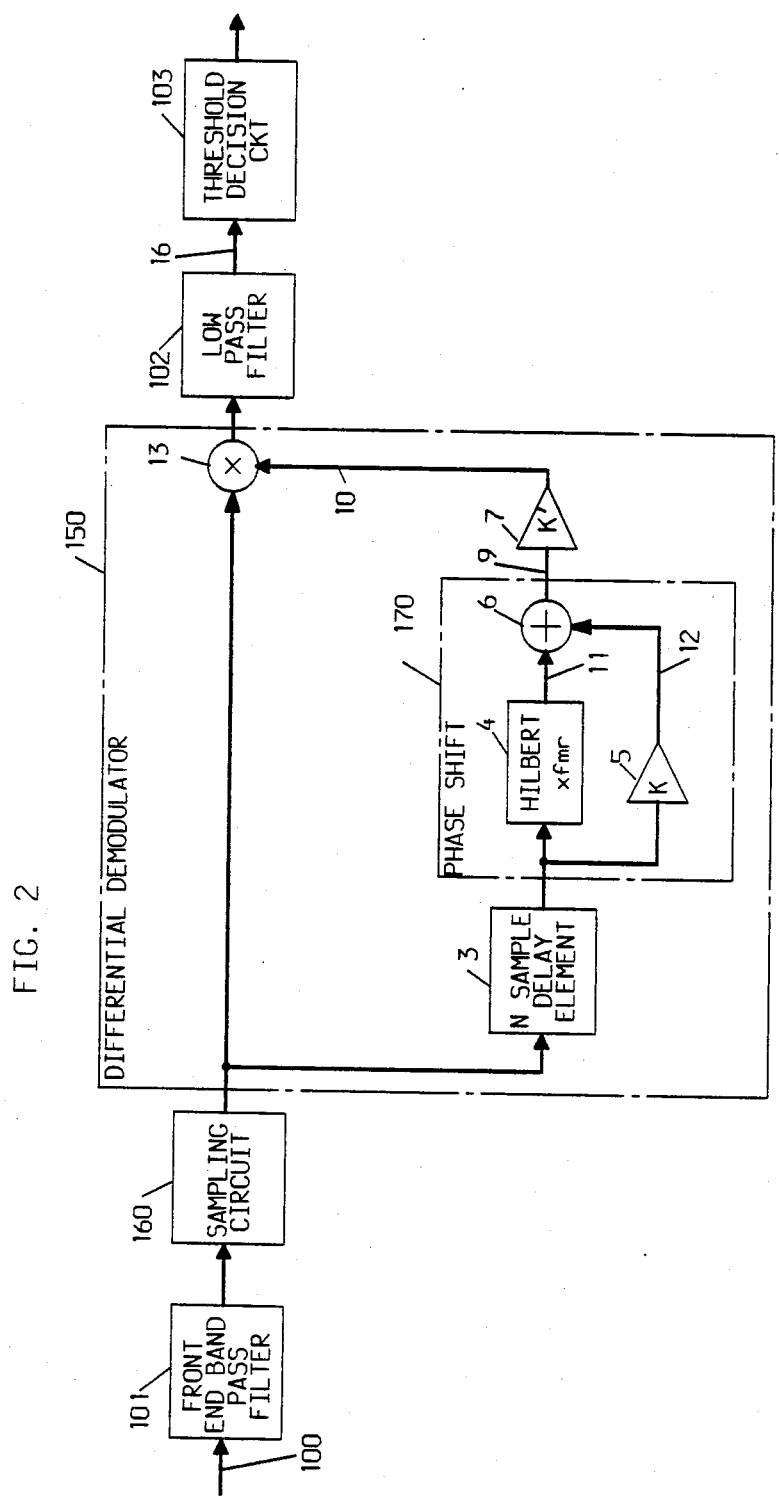
FIG. 2 is a block diagram of another embodiment of an FSK demodulator.

An alternative arrangement to that shown in FIG. 1, in which like elements retain the same designations, is illustrated in FIG. 2. Here, the sampled, band pass filtered FSK signal output from sampling circuit 160 provides one input of multiplier 13. N sample delay element 3 is positioned in series with phase shifting circuit 170, the output of which provides the second input to multiplier 13, via scaling circuit 7. The arrangement of FIG. 2 yields the same advantageous results as those obtained by the demodulator of FIG. 1.

The theory behind the operation of the demodulator arrangements of FIGS. 1 and 2 will now be described. In the analysis, the following conventions will be used:

S is the frequency at which the input FSK signal on line 100 is sampled by sampling circuit 160.

N is the number of samples of delay introduced into the sampled low pass filtered FSK signal by delay element 3.

F2 and F1 are the upper and lower FSK frequencies in the input signal.

C is the carrier (center) frequency of the input signal, which is equal to (F2+F1)/2

P is the desired phase difference between F2 and F1 that is produced at the output of delay element 3.

The units for frequency in the following equations are cycles/sec, and the units for phase are degrees.

Given a differential phase shift P has been specified, the value of the parameter N is obtained by $$N = \frac{PS}{360(F2 - F1)}. \quad (1)$$

Thus, the differential phase shifts available with the choice of an integer N are quantized with a coarseness inversely proportional to the sampling rate S.

In the succeeding discussion, it is assumed that the gain factor K' is a positive number, so that the phase shift which can be imposed on the input is limited to the range between 180 and 360 degrees. However, phase shifts of 0 to 180 degrees can be accomplished by making K' a negative number or by making the Hilbert transformer 4 advance the signal by 90 degrees instead of retard it by 90 degrees. These modifications would be straightforward and will not be discussed further. Also, in the following description, N sample delay element 3 is assumed to be positioned as shown in FIG. 1, rather than as shown in FIG. 2.

For a delay of N samples, the phase shift difference between the signals at the input and output of phase shift circuit 170 on lines 2 and 10, respectively, is desirably set at:

$$\frac{-360NC}{S} - 90, \quad (2)$$

to insure that an input signal at the carrier frequency has a dc component of 0 at the output of multiplier 13. To provide this phase shift, K should be selected to be $$K = \frac{1}{\tan\left(\frac{360NC}{S} + 90\right)}. \quad (3)$$

If no gain change can be tolerated between the input to phase shifting circuit 170 and its output, then the scaling factor K' in the optional scaling circuit 7 should have a value of $$K' = \frac{1}{\sqrt{1 + K^2}} \quad (4)$$

It should be noted that a non-unity value of K' is typically required only if the demodulator, as discussed below, is arranged to adaptively modify K over a large range. In this case, digital processing may not be able to handle the resulting large signal level changes, so that scaling circuit 7 must be used.

Figure 3:
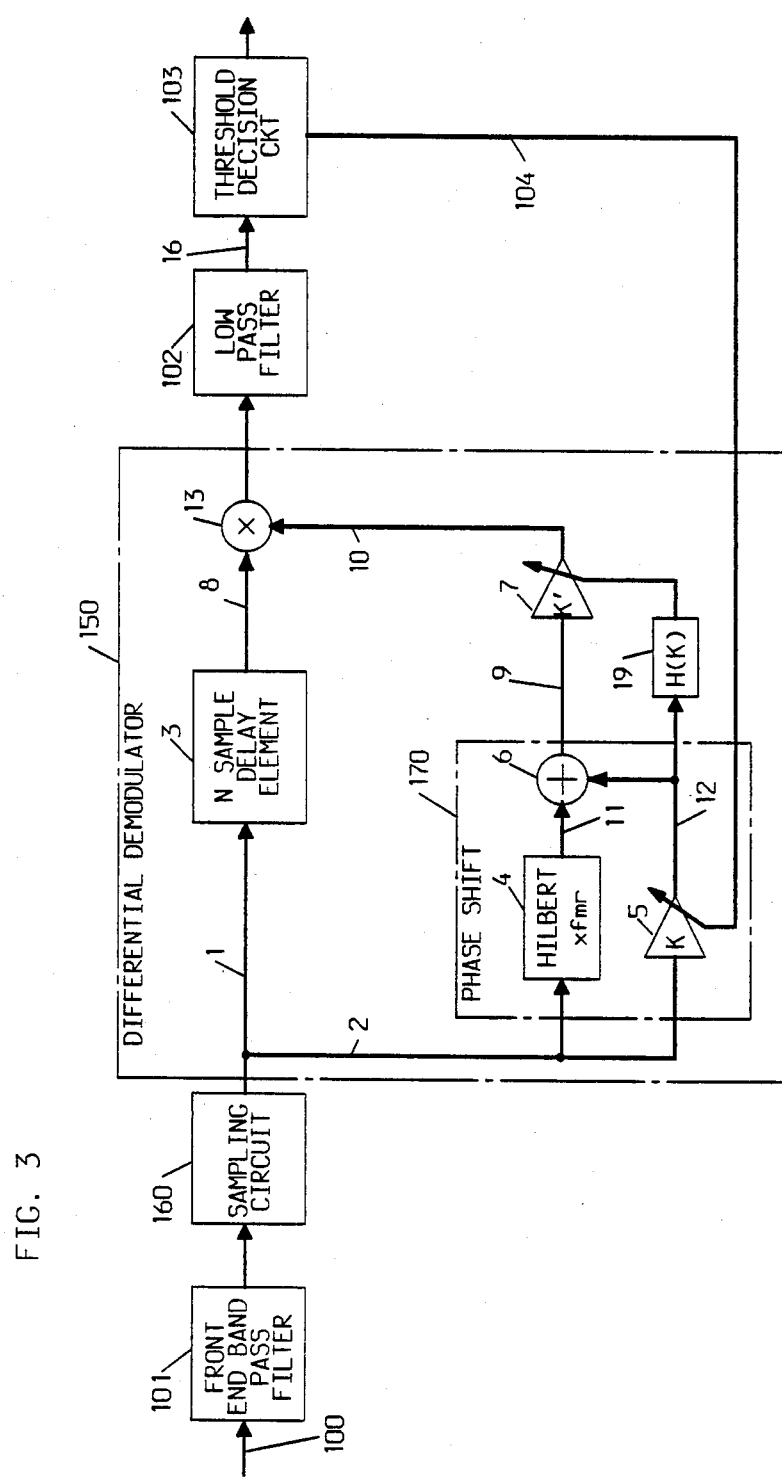
FIG. 3 is a block diagram of an FSK demodulator similar to that shown in FIG. 1 in which adaptation is provided to compensate for channel degradations.

If the upper and lower frequencies F1 and F2 in the FSK signal are not known a priori, or to compensate for communication channel degradations including frequency shifts and amplitude distortion, the demodulator arrangement of FIG. 1 (or FIG. 2) can be made adaptive as shown in FIG. 3. In this figure, corresponding elements retain the same designations.

The previously described demodulator arrangement is well suited for adaptation because of the advantageous way in which the basic demodulation functions have been separated. A first separate circuit element, namely delay element 3 in FIG. 1, provides the relative phase separation between F1 and F2 when they are separately applied to the input of the demodulator. The phase shift imposed by this circuit on a given frequency component is linearly related to the frequency of that component, and therefore has the same relative effect on any two frequencies F1 and F2 separated in frequency by a fixed difference. A second separate circuit element, namely phase shift element 170 in FIG. 1, provides the phase shift required by the two particular frequencies F1 and F2 such that the two versions of the FSK signal input to multiplier 13 will be 90 degrees out of phase at the center frequency. The phase shift produced by phase shift element 170 is determined by a single constant K. The two particular frequencies that the demodulator arrangement in FIG. 1 is optimally configured to detect are therefore determined by this single constant K. For this reason, the demodulator arrangement lands itself to adaptation schemes which change the characteristics of the demodulator to optimally tune the demodulator to operate satisfactorily where the frequencies F1 and F2 are not completely known, or to compensate for some types of communication channel degradations.

The adaptive demodulator shown in FIG. 3 includes a feedback path from threshold decision circuit 103 to variable gain circuit 5 to control the value of K in accordance with a control signal on line 104. When a compensating variable gain circuit 7 is used, its gain K' is also adjusted, based on an output from gain element 5 that is processed in a filter circuit 19. The nature of the control signal extended from threshold decision circuit 103 to gain element 5 on line 104 and used to control the value of K will be best understood by consideration of the theory behind the embodiment of FIG. 3, which is described in detail below. The various symbols used in the following discussion, which differ slightly from those used above, are:

S is the sampling frequency of sampling circuit 160 in rad/sec;

$F_c$ is the carrier (center) frequency of the FSK input signal, in rad/sec;

N is the number of samples delay introduced into the sampled low pass filtered FSK signal by delay element 3

$F_2$ and $F_1$ are the upper and lower FSK signalling frequencies;

q is a constant equal to $-2\pi N/S$;

x is the signal level produced in the steady state at the output of low pass filter 102 (line 16) when the pure tone $F_2$ is applied to the input;

y is the signal level produced in the steady state on line 16 when the pure tone $F_1$ is applied to the input; and $A_x$ and $A_y$ are positive numbers such that their ratio is equal to the ratio of the signal power of $F_2$ to the signal power of $F_1$ measured at the input to differential detector 150 (lines 1 and 2).

It will be assumed for simplicity that the gain factor $K'$ provided in gain circuit 7 is a positive number. This choice restricts the range of possible phase shifts that can be imposed on the signal input to phase shifting circuit 170, as shown by equation (5) below. A negative $K'$ can be accounted for by adding a factor of $\pi$ to the arguments of the cosine functions in equations (6) and (7) below.

Under the conditions outlined above, the phase of the signal output from phase shifting circuit 170 or gain circuit 7 if it is used (line 10) relative to that of the signal input to the phase shifting circuit 170 (line 2) is given by $$2\pi - \arctan_0^\pi \frac{1}{K} \quad (5)$$

and x and y can then be represented by $$x = A_x \cos\left( qF_2 + \arctan_0^\pi \frac{1}{K} \right) \quad (6)$$

$$y = A_y \cos\left( qF_1 + \arctan_0^\pi \frac{1}{K} \right). \quad (7)$$

In equations (6) and (7), inequality of $A_x$ and $A_y$ is caused by amplitude distortion injected by the combination of the front end filtering in filter 101 and the communication channel from which the signal on line 100 is obtained. Frequency shift manifests itself in the above equations as a constant $\Delta_f$ between the received frequencies $F_2$ and $F_1$ and the original transmitted frequencies. The time derivatives of the quantities $F_2, F_1, A_x$, and $A_y$ are assumed to be negligible. In practice, the measured values of x and y will also be affected by a noise component, the effect of which will be considered below.

Assuming the decision threshold in circuit 103 is set to 0, it is the object of the FSK demodulator to adjust K until the equality $$x = -y \quad (8)$$

is satisfied. When K satisfies this requirement, the demodulator is considered 'tuned'. Note that if there is no amplitude distortion, i.e. $A_x = A_y$, then a tuned demodulator will satisfy the equation $$\frac{\pi}{2} = qF_c + \arctan_0^\pi \frac{1}{K} \quad (9)$$

Since the goal of the adaptation is to eventually satisfy equation (8), the following error measure, $\epsilon$, is defined:

$$x + y = \epsilon. \quad (10)$$

The closer $\epsilon$ is to zero, the closer the demodulator is to being tuned.

A function $F(\epsilon)$ is now defined such that:

$$F(\epsilon) = \text{a negative number for negative } \epsilon \quad (11)$$
$$= \text{a positive number for positive } \epsilon$$
$$= \text{zero for } \epsilon = \text{zero}$$

Another function $C(\epsilon)$ is now defined in terms of $F(\epsilon)$:

$$C(\epsilon) = \int_{\epsilon_{min}}^{\epsilon} F(\epsilon) d\epsilon \quad (12)$$

where $\epsilon_{min}$ is the most negative value that $\epsilon$ can assume, a function of the demodulator and the arithmetic with which it is implemented. By definition, the function $C(\epsilon)$ will have only one minimum, and that will occur at $\epsilon = 0$. $C(\epsilon)$ can be minimized, and $\epsilon$ therefore driven to 0, by finding the gradient of $C(\epsilon)$ with respect to K, and changing K in the direction opposite the gradient. The gradient is found to be $$\frac{dC(\epsilon)}{dK} = C(\epsilon) \frac{d\epsilon}{dK} \quad (13)$$

$$= F(\epsilon) \frac{d\epsilon}{dK}$$

and K should be changed according to $$\frac{dK}{dt} = -F(\epsilon) \frac{d\epsilon}{dK}. \quad (14)$$

That $C(\epsilon)$ is minimized by this strategy can be seen multiplying equations (9) and (10) to obtain $$\frac{dC(\epsilon)}{dt} = -F^2(\epsilon) \left( \frac{d\epsilon}{dK} \right)^2. \quad (15)$$

If the value of $C(\epsilon)$ at some time T2 is compared with the value of $C(\epsilon)$ at some earlier time T1, it is found that $$C_{T2}(\epsilon) - C_{T1}(\epsilon) = \int_{T1}^{T2} -F^2(\epsilon) \left( \frac{d\epsilon}{dK} \right)^2 dt. \quad (16)$$

If the assumption is made that $d\epsilon/dK$ is never 0 (the conditions which make this assumption true will be examined below), then it can be seen that $C_{T2}(\epsilon)$ will always be either less than or equal to $C_{T1}(\epsilon)$, and will only be equal to it when $F(\epsilon)$ is equal to 0 over the time period in question, specifying also that the error $\epsilon$ is 0. Because $C(\epsilon)$ is bounded from below by its minimum value, it can be seen that as T2 approaches infinity, $F(\epsilon)$, and hence the error, must go to zero.

If K is updated in accordance with equation (14), the error $\epsilon$ will be adaptively cancelled. This relatively complicated equation can be replaced with a much simpler one if one additional restriction is placed on $d\epsilon/dK$ besides the nonzero restriction mentioned above, namely, that $d\epsilon/dk$ is always positive. In that event, K may be updated by the simpler equation:

$$\frac{dK}{dt} = -G(\epsilon) \tag{17}$$

where $G(\epsilon)$ is any function satisfying the requirements for $F(\epsilon)$ specified in equation (11). Two examples of digital signal processing algorithms for updating K that satisfy equation (17) are $$K(n+1) = k(n) - \sigma\,sign[\epsilon(n)] \tag{18}$$

and $$K(n+1) = k(n) - \sigma\epsilon(n) \tag{19}$$

where n is an index representing successive samples being processed and $\sigma$ is some constant chosen with the conflicting desires that it be small enough to prevent noisy $\epsilon(n)$ measurements from unduly affecting a converged value of K, yet large enough to permit rapid convergence to the optimum value of K. The optimal value of $\sigma$ depends on the given application; a typical value may be 0.01.

The requirements imposed on the system by the conditions on $d\epsilon/dK$ are now examined. To ease the following notation, let $$r = \arctan_0^\pi \frac{1}{K}, \tag{20}$$

and note that $dr/dK$ is everywhere nonzero and $$sign\left(\frac{dr}{dK}\right) = -1. \tag{21}$$

Then from equations (6), (7), (10), (20), and (21), we obtain:

$$sign\left(\frac{d\epsilon}{dK}\right) = sign\left(\frac{d\epsilon}{dr}\right) sign\left(\frac{dr}{dK}\right) = -sign\frac{d\epsilon}{dr}, \tag{22}$$

and $$\epsilon = A_x\cos(qF_2 + r) + A_y\cos(qF_1 + r). \tag{23}$$

The requirement imposed on the system that $d\epsilon/dK$ always be positive and nonzero can then be expressed as:

$$-\frac{d\epsilon}{dr} > 0, \tag{24}$$

or

-continued
$$A_x\sin(qF_2 + r) + A_y\sin(qF_1 + r) > 0. \tag{25}$$

It should be remembered that $$qF_2+r<qF_1+r \tag{26}$$

since $F_2$ is greater than $F_1$ and q is negative.

Certainly equation (25) holds true for the case where $$0<qF_2+r<qF_1+r<\pi. \tag{27}$$

This inequality will be true anywhere in the vicinity of the tuned point of a demodulator operating on frequencies where $A_x$ is equal to $A_y$, since, from equation (9), $$qF_c + r = \frac{\pi}{2}. \tag{28}$$

Equation (25) will remain true when $qF_1+r>\pi$ provided $$A_x\sin(qF_2+r) > -A_y\sin(qF_1+r) \tag{29}$$

For the particular case where $A_x$ is equal to $A_y$, equation (29) will be satisfied everywhere that $$qF_c+r<\pi. \tag{30}$$

Likewise, for $qF_2+r<0$ and $A_x=A_y$, equation (25) will be satisfied for all $$qF_c+r>0. \tag{31}$$

It can therefore be concluded that $d\epsilon/dK$ will be strictly positive and nonzero for a large range of K including and surrounding the tuned demodulator value of K.

As mentioned previously, the value of K affects the signal level on line 9. In applications where K is expected to make only small excursions, the resulting signal level variations will usually be of no significance to the operation of the circuit. This will normally be the case when the object of the adaptation is to cancel communication channel degradations. However, in applications where large deviations in the value of K are expected, and the resulting signal level excursions on line 9 are too great to be handled by the ensuing arithmetic. A variable gain scaling circuit 7 can be incorporated to compensate for these excursions. FIG. 3 shows an optional filter circuit 19 which adjusts the gain, K', of scaling circuit 7 in accordance with the value of K so as to keep the signal levels found on line 10 within acceptable limits for the ensuing arithmetic. If the filter circuit 19 implements equation (4), then no signal level variations will be produced as K is adapted. In practice, any function H(K) can be used which adjusts K' as K is adapted so as to keep the resulting signal level excursions within the acceptable limits of the ensuing arithmetic.

Although FIG. 3 shows the linear phase shift produced by an N sample delay element 3, a demodulator using any other scheme to produce a linear phase shift on the range of frequencies over which the demodulator will be adapted is also suited for use with the following adaptation technique.

Attention is now directed to the practical means of measuring $\epsilon$ during the demodulation process so that no training sequence is required at the start of demodulation, and K is left free to adapt during a subsequent time interval without the danger of K diverging on any particular sequence of FSK encoded data. In this manner, K may track slow variations in degradations on the communication channel over which the FSK signal is transmitted.

In practice, the measured values of x and y will be contaminated with a noise component. However, it can be seen that if the difference in the uncorrupted magnitudes of x and y are large compared to the random noise component, then the corrupted $\epsilon$ will still have the correct sign a large percentage of the time and K will be adjusted so as to equalize the magnitudes of x and y.

Figure 4:
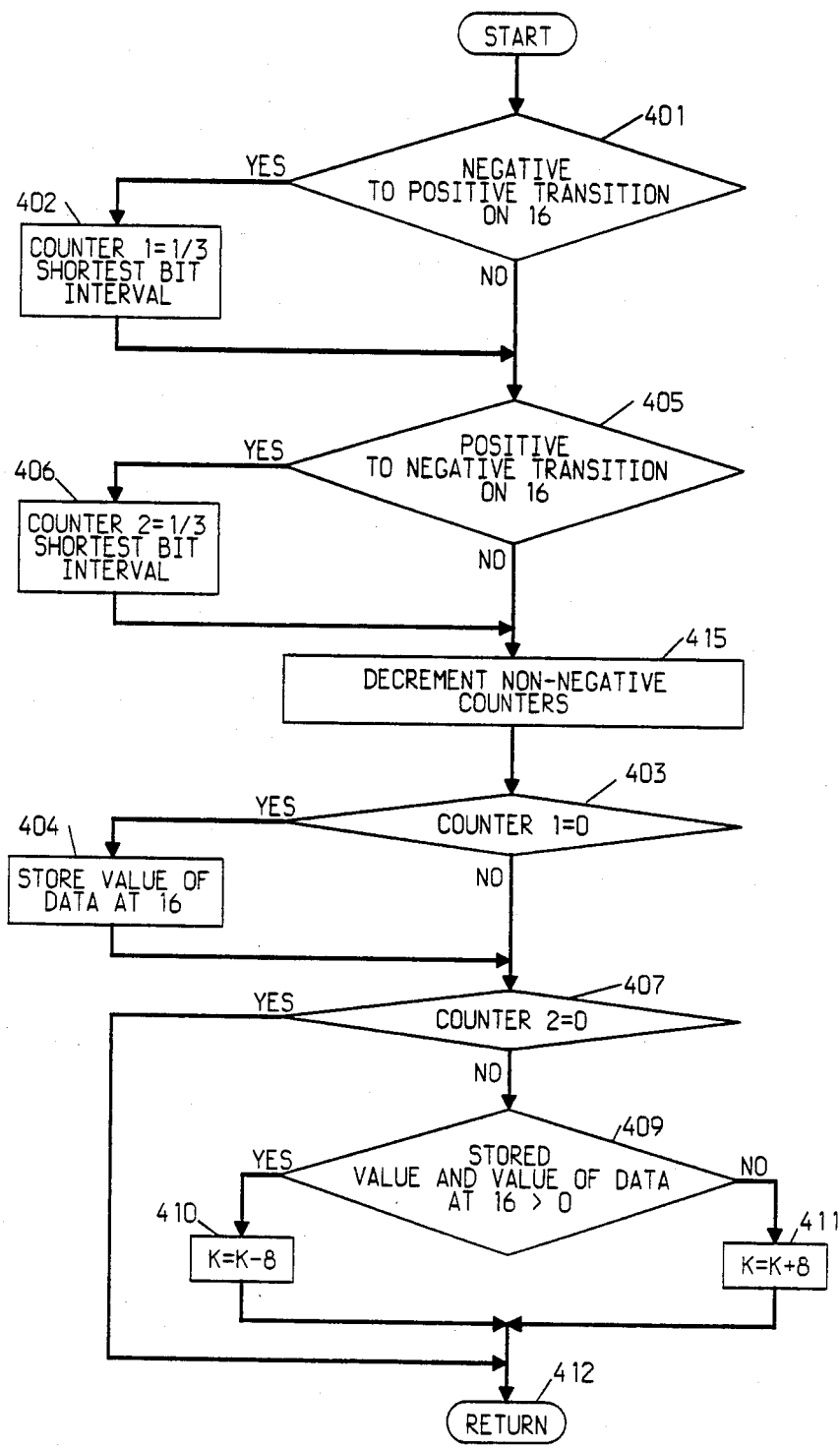
FIG. 4 is a flow chart illustrating one technique for controlling the adaptation coefficients within the demodulator of FIG. 3.

The following algorithm, an example of which is depicted in the flowchart of FIG. 4, is suitable for measuring the relative difference in magnitudes of x and y. The algorithm is performed by threshold decision circuit 103 each time a new digital sample is output from filter 102 on line 16 until the return statement (step 412) is encountered. After a negative to positive transition is detected in the output of filter 102 on line 16 by the threshold decision circuit 103 (test step 401), a first counter (not shown) is started which counts a predetermined number of samples beyond that transition (step 402). The counts in the first counter and a second counter described below are decremented in step 415 during each execution of this algorithm in which they are not negative. The number of counted samples depends upon the expected time interval (period) of each bit of the data signal which modulated the FSK carrier. After a 'reasonable' fraction of the shortest anticipated bit interval has elapsed (test step 403), (e.g., $\frac{1}{3}$ of the interval) the value of the signal on line 16 is stored or recorded (step 404). After the next positive to negative transition is observed by threshold detector 17 (test step 405), a second counter is started to count into the ensuing bit interval (step 406). When the same predetermined number of samples have again been counted (test step 407) the value of signal 16 is added to the previously stored value (step 409) and K is adjusted in a direction determined by the sign at the sum (steps 410 and 411). The foregoing process is then repeated. It should be noted that a positive to negative transition on the output of filter 102 on line 16 may be detected (step 405) before the first counter has reached 0 and step 404 has been executed. This may happen in a case in which the demodulator is far from its optimally tuned condition. In this event, the adaptation algorithm depicted in FIG. 4 still performs properly.

In either case described above, the running sum formed in step 409 is a function of $\epsilon(n)$ which satisfies the requirements on the function $G(\epsilon(n))$. Therefore, its value is suitable for use in equation (17). Thus, when $\epsilon(n)$ is positive (test step 409), the new value of $K_{n+1}=K_n-\sigma$ (step 410) and when $\epsilon(n)$ is negative, then $K_{n+1}=K_n+\sigma$ (step 411). The foregoing technique applies as long as the rate at which the signal on line 16 leaves the 0 level threshold is proportional to the maximum positive or negative value it will assume during each bit interval, which is usually the case, with respect to the FSK demodulators described above. The reasonable fraction mentioned above should be less than $\frac{1}{2}$, so that the level of the signal on line 16 is sampled prior to the mid-point of the shortest possible bit interval, reducing the effects of intersymbol interference on this measure.

In the case of a threshold detector with a decision level fixed at the value 0, additional constraints are placed on the amount of misalignment allowed in the initial choice of K if the above algorithm is to adapt. The constraints stem from the requirement that the received signal pass through the threshold value as the receiver's input frequencies are changed. The constraint is satisfied if the initial conditions are:

$$qF_2 + r < \frac{\pi}{2} \tag{32}$$

and $$qF_1 + r > \frac{\pi}{2}. \tag{33}$$

This additional constraint is usually of little consequence, as the deviation allowed in r while still satisfying equations (32) and (33) is $q(F_1-F_2)$ In FSK receivers where the modulating frequencies $F_1$ and $F_2$ are known and the purpose of the adaptation is to cancel noise effects, this constraint is thus insignificant.

It is readily observed that the value of K produced using the technique illustrated in the flowchart of FIG. 4 does not diverge during long periods of one or the other frequency, and in addition requires no initial training sequence of data, nor a knowledge of the asynchronous bit rate. The algorithm converges at a rate proportional to the rate at which the frequencies are alternately applied to the receiver.

In FSK implementations in which the receiver does not know a priori what the transmitted frequencies are, and in which the receiver must thus adapt to a wide range of frequencies, the constraint that the received signal cause excursions across the threshold can be circumvented by imposing some requirements on the initial sequence produced by the transmitter. If the minimum initial rate at which the frequencies $F_1$ and $F_2$ will be alternately applied to the receiver is known, the adaptation algorithm of the present invention can be augmented with a timer which times an interval during which at least one change in the received frequencies is expected. If no transition is observed by the threshold detector during this interval, then the level on signal 16 would be sampled and taken to represent $G(\epsilon(n))$, since it can be assumed that both frequencies produce values that lie on one side of the threshold. K would then be updated accordingly. After a number of these updates, the demodulator will be tuned such that switching receiver frequencies will cause a threshold transition. At a point after several transitions have been observed, the time interval portion of the adaptive algorithm is disabled, and updates then occur in the normal manner.

Figure 5:
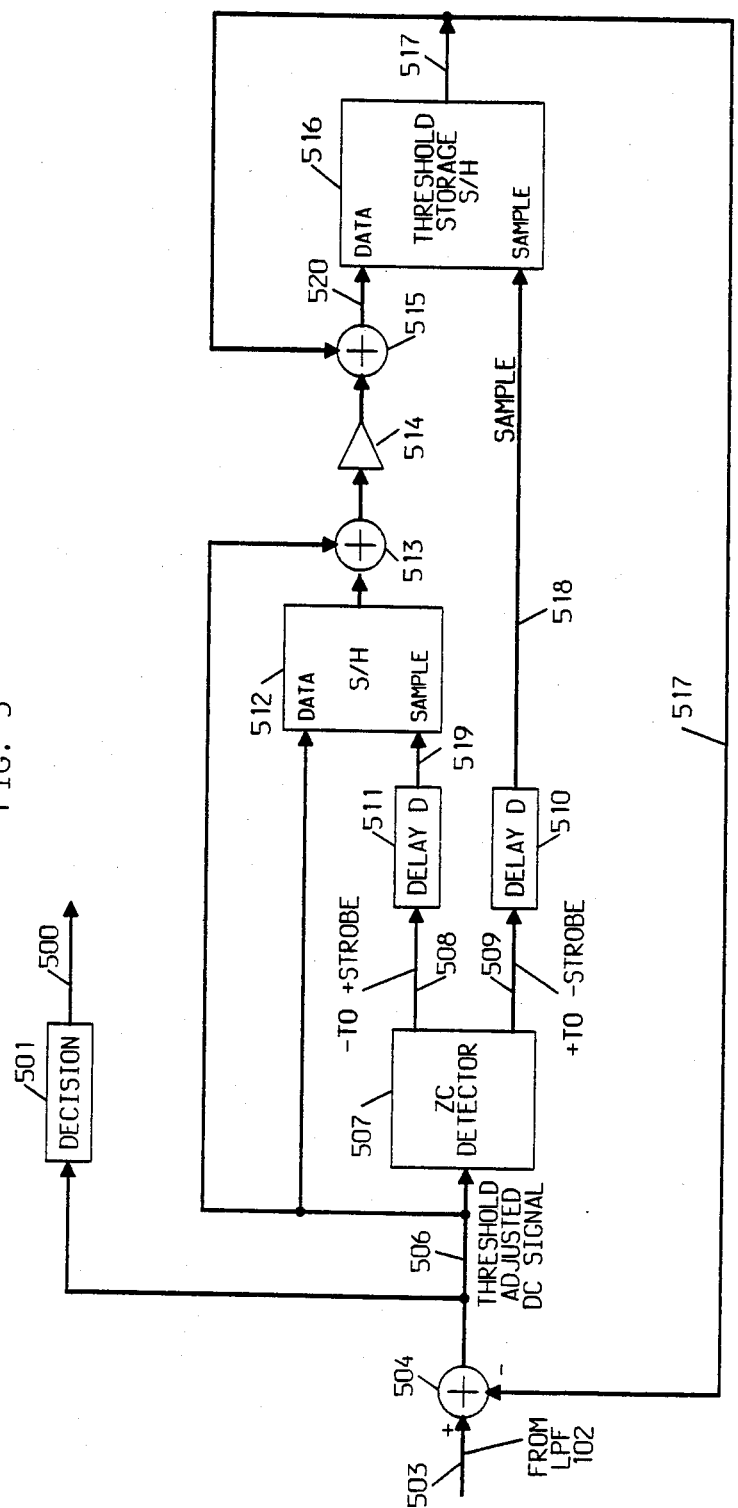
FIG. 5 is a block diagram of an adaptive threshold detector arranged in accordance with another aspect of the present invention.

As an alternative to the adaptation arrangement shown in FIG. 3, the FSK demodulator of the present invention shown in FIGS. 1 or 2 can be used with an adaptive threshold detector in order to dynamically change the detector's decision point. This arrangement enables the FSK receiver to compensate for communication channel degradations such as frequency shift or amplitude distortion which results in a constant or nearly constant bias in the output of the low pass filter 102 on line 16. The technique can be implemented in hardware as shown in FIG. 5. Alternately, the technique is extremely simple to implement in a digital signal processor, resulting in an algorithm very similar to that depicted in FIG. 4. The transformation of the hardware implementation to an algorithm similar to that of FIG. 4 is straightforward. Although this aspect of the present invention is well suited for operation with the FSK demodulator shown in FIGS. 1 or 2, it can also be used to process other signals which vary around an assumed threshold whose placement is optimally chosen to lie in the middle of the signal's two most extreme excursions.

In the context of the FSK demodulators of FIGS. 1 or 2, it is the function of threshold detector 103 to distinguish between the levels produced by the upper and lower frequencies in the input signal. The value chosen as a 'threshold', i.e. above which value it will be considered that one frequency is being received, and below which value it will be considered that the other frequency is being received, is typically fixed at the midpoint of the levels which would be produced in the absence of any communication channel distortion. In the presence of distortions that tend to affect the dc levels output by the demodulator by changing them a constant amount in a specific direction, the ability of the threshold demodulator to make the correct decision in the midst of other, random, noise components is adversely affected.

Generally speaking, in accordance with this aspect of the present invention, the threshold value T to which received levels are referenced is adaptively changed so as to cancel the relatively constant noise components introduced by channel degradations. The invention thereby improves the threshold detector's ability to make the correct decisions in the face of random noise components.

Referring now to FIG. 5, apparatus in accordance with the principles of the present invention which can perform the functions of threshold decision circuit 103 of FIGS. 1 and 2 is shown. An input representing a low pass filtered version of a differentially demodulated FSK signal is received on line 503 from, for example, low pass filter 102 and is applied to one input of an adder circuit 504. The other input of adder circuit 504 is the negated current threshold value stored in a sample and hold circuit 516. Ideally, the apparatus of FIG. 5 is intended to dynamically set and maintain the threshold value at or near the midpoint of the maximum excursions of the demodulator output signal.

The difference generated by circuit 504 on line 506 is denominated a "threshold adjusted" signal and is applied to a decision circuit 501 which merely determines whether the threshold adjusted signal is positive or negative. The output from circuit 501 on line 500 represents the original FSK encoded data.

The output from adder circuit 504 on line 506 is also applied to a zero crossing detector 507 which is arranged to detect both negative to positive and positive to negative transitions in the threshold adjusted signal. Each negative to positive transition produces a strobe on line 508 which in turn strobes the sample input of a sample and hold circuit 512 after a fixed delay interval D provided by delay circuit 511. Advantageously, the delay interval D is equivalent to a preselected fraction (e.g., ⅓) of the shortest interval expected between successive threshold excursions. Each positive to negative transition causes detector 507 to produce a strobe on line 509, which in turn strobes the sample input of a second sample and hold circuit 516 after a similar delay interval D provided by a second delay circuit 510.

By virtue of the arrangement of FIG. 5, sample and hold circuit 512 stores the value of the threshold adjusted signal on line 506 at a preselected time interval after each positive going zero crossing. The sum of the stored value in sample and hold circuit 512 is combined with the current value of the threshold adjusted signal in adder circuit 513, scaled by a fraction $\sigma$ in scaling circuit 514, and then combined in adder circuit 515 with the threshold value stored in sample and hold circuit 516. Since the strobe applied to the sample input of threshold storage circuit 516 occurs at a preselected time interval after each positive to negative transition of the threshold adjusted signal, the value stored in circuit 516 thus represents the sum of (1) the current threshold and (2) a weighted average of the threshold adjusted signal at a preselected time after successive (i.e., positive to negative and negative to positive) zero crossings. A typical value for $\sigma$ would be 1/100 of the maximum value reached by the threshold adjusted signal on line 16.

The theory behind the operation of the threshold detector illustrated in FIG. 5 is described in detail below, and the conditions under which the adaptation will successfully take place are also derived. The various symbols used in the following discussion are as follows:

$F_2$ and $F_1$ are the upper and lower FSK signalling frequencies, respectively.

x is the signal level produced in the steady state at the input to the threshold detector when the pure tone $F_2$ is applied to the input of the FSK demodulator.

y is the signal level produced in the steady state at the input to the threshold detector when the pure tone $F_1$ is applied to the input of the FSK demodulator.

T is the threshold decision point, such that when the signal at the input to the threshold detector is at a level $T + \Delta_T$ it is decided that tone x is being received, and when the signal at the input to the threshold detector is at a level $T - \Delta_T$ it is decided that tone y is being received, where $\Delta_T$ is some application specific constant which may be 0.

It is the object of the threshold adaptation to adjust the value of T until the equality $$x - T = T - y \qquad (34)$$

is satisfied, which is to say that the threshold is centered between the two levels which are produced when the two frequencies are separately input to the receiver. A demodulator whose threshold detector's choice of T satisfies this requirement will be called a 'tuned' demodulator. Since the goal of the adaptation is to eventually satisfy equation (34), the following error measure, $\epsilon$, is defined $$(x - T) + (y - T) = \epsilon. \qquad (35)$$

The closer $\epsilon$ is to zero, the closer the demodulator is to being tuned.

A function $F(\epsilon)$ is now defined such that $$F(\epsilon) = \text{a negative number for negative } \epsilon \qquad (36)$$
$$= \text{a positive number for positive } \epsilon$$
$$= \text{zero for } \epsilon = \text{zero}$$

Another function $C(\epsilon)$ is now defined in terms of $F(\epsilon)$:

$$C(\epsilon) = \int_{\epsilon_{min}}^{\epsilon} F(\epsilon)d\epsilon \tag{37}$$

where $\epsilon_{min}$ is the most negative value that $\epsilon$ can assume, a function of the demodulator and the arithmetic with which it is implemented. By definition, the function $C(\epsilon)$ will have only one minimum, and that will occur at $\epsilon = 0$. $C(\epsilon)$ can be minimized, and $\epsilon$ therefore driven to 0, by finding the gradient of $C(\epsilon)$ with respect to T, and changing T in the direction opposite the gradient. The gradient is found to be $$\frac{dC(\epsilon)}{dT} = C'(\epsilon)\frac{d\epsilon}{dT} \tag{38}$$

$$= -2F(\epsilon) \tag{39}$$

and T should thus be changed according to $$\frac{dT}{dt} = 2F(\epsilon). \tag{40}$$

That $C(\epsilon)$ is minimized by this strategy can be seen by multiplying equations (39) and (40) to obtain $$\frac{dC(\epsilon)}{dt} = -4F^2(\epsilon). \tag{41}$$

If the value of $C(\epsilon)$ at some time T2 is compared with the value of $C(\epsilon)$ at some earlier time T1, it is found that $$C_{T2}(\epsilon) - C_{T1}(\epsilon) = \int_{T1}^{T2} -4F^2(\epsilon)dt. \tag{42}$$

It can then be seen that $C_{T2}(\epsilon)$ will always be either less than or equal to $C_{T1}(\epsilon)$, and will only be equal to it when $F(\epsilon)$ is equal to 0 over the time period in question, specifying also that the error $\epsilon$ is 0. Because $C(\epsilon)$ is bounded from below by its minimum value, it can be seen that as T2 approaches oo, $F(\epsilon)$, and hence the error, must go to zero.

If T is updated in accordance with equation (40), the error will be adaptively cancelled.

Two examples of digital signal processing algorithms for updating T that satisfy equation (40) are $$T(n+1) = T(n) + sign[\epsilon(n)] \times \sigma \tag{43}$$

and $$T(n+1) = T(n) + \epsilon(n) \times \sigma, \tag{44}$$

where $\sigma$ is some constant chosen with the conflicting desires that it be small enough to prevent noisy $\epsilon(n)$ measurements from unduly affecting a converged value of T, yet large enough to permit rapid convergence to the optimum value of T.

Attention is now directed to the practical means of measuring $\epsilon$ during the demodulation process so that no training sequence is required at the start of the connection, and T is left free to adapt during the connection without the danger of T diverging on any received sequence of data. In this manner, T may track slow variations in channel degradations.

In practice, the measured values of x and y will be contaminated with a noise component. However, it can be seen that if the misalignment of T with respect to the uncorrupted values of x and y is large compared to the random noise component, then the corrupted $\epsilon$ which is measured will still have the correct sign a large percentage of the time and T will be adjusted so as to converge on its tuned value.

Apparatus for adaptively adjusting a threshold value T to lie midway between the maximum excursions of a slowly varying input signal is depicted in FIG. 5 as previously described. As in step 409 of FIG. 4, the sum formed by adder circuit 513 at the time that the sample strobe on line 518 occurs is a function of $\epsilon(n)$ which satisfies the requirements on the function $F(\epsilon(n))$ of equation (40) if the rate at which the threshold adjusted signal on line 506 leaves zero after each transition is proportional to the maximum positive or negative value it will assume during each ensuing interval. A further requirement is that the delay D introduced by delay elements 510 and 511 equals some "reasonable" fraction of the shortest excursion to either side of a tuned threshold. A reasonable fraction would typically be less than ½, so as to reduce the effects of intersymbol interference. In these cases, when $\epsilon(n)$ is positive, the output of adder circuit 513 will also be positive, and when $\epsilon(n)$ is negative, the output of adder circuit 513 will also be negative.

In the case of an adaptive threshold detector with an initial decision level at the value $T_i$, a constraint is placed on the amount of allowed signal distortion if the above algorithm is to adapt. The constraint stems from the requirement that the received signal pass through the threshold value $T_i$ as the receiver's input frequencies are changed. The signal distortion normally present in existing FSK communications is small enough to meet the above requirement. However, in FSK implementations designed to operate in the presence of severe communication channel degradations by incorporating the method of threshold adaptation described here, the constraint can be eliminated by imposing some requirements on the initial sequence produced by the transmitter. If the minimum initial rate at which the frequencies $F_1$ and $F_2$ will be alternately applied to the receiver is known, the technique illustrated in FIG. 5 can be augmented with a timer which times an interval during which at least one change in the received frequencies is expected. If no transition is observed by the threshold detector during this interval, then the level of the threshold adjusted signal would be sampled, and taken to represent $\epsilon(n)$, since it can be assumed that both FSK frequencies produce values that lie on the same side of the threshold. T would then be updated accordingly. After a number of these updates, the demodulator will be tuned such that a switch of the input FSK frequency will cause a threshold transition. After several transitions have been observed, the time interval portion of the adaptive algorithm is disabled, and updates occur in the normal manner.

It is readily observed that the threshold produced by the apparatus illustrated in FIG. 5 does not diverge during long sequences of one or another FSK frequency, and in addition requires no initial training sequence of data, nor a knowledge of the asynchronous bit rate. The technique embodied in the apparatus produces a threshold value that converges at a rate proportional to the rate at which the frequencies are alternately applied to the receiver.

By virtue of the present invention, a digital FSK demodulator can be straightforwardly tailored for use in widely varying applications by solving a simple set of equations which relate demodulator parameters to desired demodulator characteristics. The demodulator characteristics which are selectable are (1) the desired differential phase shift of the two FSK frequencies as a function of their frequency separation, and (2) the frequencies for which the demodulator will be optimally tuned as determined by the FSK carrier (center) frequency. The differential phase shift portion of the demodulator produces an exactly linear phase shift, and introduces no additional slope distortion into the signal. The frequencies for which the demodulator is tuned are determined by a single coefficient K, and the structure therefore lends itself to adaptation during operation to compensate for channel degradations or to demodulate frequencies of which it has little or no a priori knowledge. The ease with which demodulator characteristics can be translated into demodulator parameters aids efforts to empirically determine the optimum demodulator characteristics for a given signal.

If desired, the demodulator can be made adaptive by controlling the value of K as a function of previous estimates and a measure related to the error $\epsilon(n)$ which measures how close the demodulator is to being tuned. Additionally, a similar adaptive technique can be used to establish a threshold midway between the positive and negative excursions of a slowly varying signal.

It will be appreciated that various modifications can be made in the present invention by those of ordinary skill in the art.

What is claimed is:

1. Apparatus for demodulating a frequency shift keyed (FSK) signal having upper and lower frequency components, said apparatus including
    first means for providing a delayed version of said FSK signal, each frequency component in said delayed version being phase shifted in an amount which is linearly related to the frequency of said component,
    second means for shifting the phase of said FSK signal by a preselected constant value such that a center frequency which is halfway between said upper and lower frequency components is 90 degrees out of phase with the phase of the center frequency of said delayed version, and
    third means responsive to said delayed version and the output of said second means for providing an output indicative of the relative phase difference therebetween.

2. The invention defined in claim 1 wherein said third means is arranged to form the product of said delayed version with the output of said second means.

3. The invention defined in claim 1 wherein said FSK signal is a signal that is sampled at a frequency S and wherein said first means includes an N-sample delay element.

4. The invention defined in claim 1 wherein said second means is arranged to combine a gain adjusted version of said FSK signal with a version of said FSK signal that is phase shifted by ±90 degrees.

5. The invention defined in claim 4 wherein said second means includes a Hilbert transform circuit arranged to shift the phase of said upper and lower frequency components of said FSK signal by ±90 degrees and a scaling circuit arranged to scale said upper and lower frequency components by a gain factor K.

6. The invention defined in claim 5 wherein said apparatus further includes means for adaptively adjusting the value of K.

7. The invention defined in claim 6 wherein said adaptive adjusting means is arranged to adapt the value of K as a function of an error signal e which is a function of the difference between the output x of said demodulator when an FSK signal containing only said upper frequency component is applied to said apparatus as compared to the output y of said demodulator when an FSK signal containing only said lower frequency component is applied to said apparatus.

8. The invention defined in claim 7 wherein the current value of K is formed as the previous value of K less a correction factor delta times a selected function of e, where delta is a constant and said function is selected so that $$F(\leftarrow) = \text{a negative number for negative} \leftarrow$$
$$= \text{a positive number for positive} \leftarrow$$
$$= \text{zero for} \leftarrow = \text{zero}.$$

9. The invention defined in claim 8 wherein said apparatus further includes means for computing e by comparing the values of the output of said demodulation apparatus at selected intervals following each instant at which said output crosses a threshold.

10. Apparatus for demodulating a frequency shift keyed (FSK) signal having upper and lower frequency components, said apparatus including
    first means for providing two versions of said FSK signal such that (1) said two versions have a linear phase shift vs. frequency characteristic relative to each other, and (2) said two versions are shifted by 90 degrees in phase relative to each other at a center frequency halfway between said upper and lower frequencies, and
    second means responsive to said two versions for providing an output indicative of the relative phase difference between said two versions,
    wherein said first means includes a constant phase shift circuit for providing said 90 degree shift in phase at said center frequency.

11. The invention defined in claim 10 wherein said first means includes a delay element for providing said linear phase shift vs. frequency characteristic.

12. The invention defined in claim 10 wherein said constant phase shift circuit includes a ±90 degree phase shift circuit and a scaling circuit with a gain factor K, and wherein said apparatus further includes means for adaptively adjusting the characteristics of the demodulator by changing the value of K.

13. Apparatus for demodulating a sampled frequency shift keyed (FSK) signal having upper and lower frequency components F1 and F2 and a center frequency Fc=F1+F2/2, said apparatus including
    means for forming a first version of said FSK signal having a linear phase shift vs. frequency characteristic,
    means for forming a second version of said FSK signal having a preselected constant phase shift at said center frequency, and
    means for forming the product of said first and second versions, such that said upper and lower frequencies produce signals with a positive and negative d.c. component, wherein said first version forming means includes means for delaying said samples by N sample intervals.

14. Apparatus for demodulating a sampled frequency shift keyed (FSK) signal having upper and lower frequency components F1 and F2 and a center frequency Fc=F1+F2/2, said apparatus including
   means for forming a first version of said FSK signal having a linear phase shift vs. frequency characteristic,
   means for forming a second version of said FSK signal having a preselected constant phase shift at said center frequency, and
   means for forming the product of said first and second versions, such that said upper and lower frequencies produce signals with a positive and negative d.c. component,
   wherein said second version forming means includes a combining circuit arranged to combine a level shifted version of said FSK signal with a phase shifted version of said FSK signal formed in a Hilbert transformation circuit.

15. The invention defined in claim 13 wherein said second version forming means includes first filter means for shifting the phase of said FSK signal by ±90 degrees, means for adjusting the gain of said FSK signal by a factor K, and means for combining the output of said first filter means with said gain-adjusted signal.

16. The invention defined in claim 15 wherein said apparatus further includes means for adaptively adjusting the value of K.

17. Apparatus for demodulating a frequency shift keyed (FSK) signal having upper and lower frequency components, said apparatus including
   first means for providing a delayed version of said FSK signal, each frequency component in said delayed version being phase shifted in an amount which is linearly related to the frequency of said component,
   second means for shifting the phase of said delayed version by a preselected constant value such that a center frequency which is halfway between said upper and lower frequency components is 90 degrees out of phase with the phase of the center frequency of said FSK signal, and
   third means for forming the product of said FSK signal with the output of said second means.

18. Apparatus for demodulating a frequency shift keyed (FSK) signal having upper and lower frequency components, including
   means responsive to said FSK signal for generating a slowly varying signal which moves towards a first signal level while said upper frequency component is present in said FSK signal and which moves towards a second signal level while said lower frequency component is present in said FSK signal,
   means for comparing said slowly varying signal to a threshold T to provide an indication of which of said upper or lower frequency components is present in said FSK signal, and
   means for adaptively varying T to lie midway between said first and second signal levels, wherein said last mentioned means includes
   means for measuring the value of said slowly varying signal at a preselected time interval after said slowly varying signal crosses the currently set value of said threshold, said time interval being a small fraction of the smallest expected time interval between crossings of said threshold, and
   means for adjusting said threshold as a function of said measured values and the current value of said threshold.

19. A method of demodulating a frequency shift keyed (FSK) signal having upper and lower frequency components comprising the steps of
   providing a delayed version of said FSK signal, each frequency component in said delayed version being phase shifted in an amount which is linearly related to the frequency of said component,
   shifting the phase of said FSK signal by a preselected constant value such that a center frequency which is halfway between said upper and lower frequency components is 90 degrees out of phase with the phase of the center frequency of said delayed version, and providing an output in response to said delayed version and said phase shifted signal indicative of the relative phase difference therebetween.

20. A method of demodulating a sampled frequency shift keyed (FSK) signal having upper and lower frequency components F1 and F2 and a center frequency Fc=F1+F2/2 including the steps of
   forming a first version of said FSK signal having a linear phase shift vs. frequency characteristic,
   forming a second version of said FSK signal having a preselected constant phase shift at said center frequency, and
   forming the product of said first and second versions, such that said upper and lower frequencies produce signals with positive and negative d.c. components, respectively,
   wherein said first version forming step includes delaying said samples by N sample intervals.

21. A method of demodulating a sampled frequency shift keyed (FSK) signal having upper and lower frequency components F1 and F2 and a center frequency Fc=F1+F2/2 including the steps of
   forming a first version of said FSK signal having a linear phase shift vs. frequency characteristic,
   forming a second version of said FSK signal having a preselected constant phase shift at said center frequency, and
   forming the product of said first and second versions, such that said upper and lower frequencies produce positive and negative d.c. signals, respectively,
   wherein said second version forming step includes the step of combining a level shifted version of said FSK signal with a phase shifted version of said FSK signal formed in a Hilbert transformation circuit.

22. A method of demodulating a frequency shift keyed (FSK) signal having upper and lower frequency components including the steps of
   generating in response to said FSK signal a slowly varying signal which moves towards a first signal level while said upper frequency component is present in said FSK signal and which moves towards a second signal level while said lower frequency component is present in said FSK signal,
   comparing said slowly varying signal to a threshold T to provide an indication of which of said upper or lower frequency components is present in said FSK signal, and
   adaptively varying T to lie midway between said first and second signal levels, wherein said varying step includes measuring the value of said slowly varying signal at a preselected time interval after said slowly varying signal crosses the currently set value of said threshold, said time interval being a small fraction of the smallest expected time interval between crossings of said threshold, and adjusting said threshold as a function of said measured values and the current value of said threshold.

* * * * *